United States Patent
Oku et al.

(10) Patent No.: US 7,677,060 B2
(45) Date of Patent: Mar. 16, 2010

(54) METHOD FOR MANUFACTURING OPTICAL FIBER AND THE COOLING OF THE OPTICAL FIBER

(75) Inventors: Masato Oku, Chiyoda-ku (JP); Takashi Suzuki, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 1088 days.

(21) Appl. No.: 11/155,475

(22) Filed: Jun. 20, 2005

(65) Prior Publication Data

US 2006/0002671 A1   Jan. 5, 2006

Related U.S. Application Data

(63) Continuation-in-part of application No. 11/084,144, filed on Mar. 21, 2005, now abandoned.

(30) Foreign Application Priority Data

Apr. 9, 2004   (JP)   ............... 2004-115733

(51) Int. Cl.
   *C03B 25/04*   (2006.01)
(52) U.S. Cl. .............. 65/434; 65/510; 65/513
(58) Field of Classification Search ........... 65/434, 65/510, 513
See application file for complete search history.

(56) References Cited

U.S. PATENT DOCUMENTS

| 5,320,658 | A  | * | 6/1994 | Ohga et al. ............... 65/435 |
| 6,400,878 | B1 |   | 6/2002 | Nagayama et al. |
| 6,565,775 | B2 |   | 5/2003 | Dubois et al. |
| 6,851,282 | B2 |   | 2/2005 | Nagayama et al. |
| 6,901,196 | B2 | * | 5/2005 | Takahashi et al. ......... 385/124 |
| 2001/0006262 | A1 | * | 7/2001 | Dubois et al. ............. 264/1.24 |
| 2003/0086670 | A1 | * | 5/2003 | Moridaira et al. ......... 385/123 |
| 2004/0031291 | A1 |   | 2/2004 | Hamada et al. |
| 2005/0172675 | A1 | * | 8/2005 | Takahashi .................. 65/402 |

FOREIGN PATENT DOCUMENTS

| JP | 4-59631 | 2/1992 |
| JP | 2002-148466 | 5/2002 |
| JP | 2005-187285 | 7/2005 |
| WO | WO 2004/007383 A1 | 1/2004 |

* cited by examiner

*Primary Examiner*—Steven P Griffin
*Assistant Examiner*—Queenie Dehghan
(74) *Attorney, Agent, or Firm*—Oblon, Spivak, McClelland, Maier & Neustadt, L.L.P.

(57) ABSTRACT

A method for manufacturing an optical fiber by drawing an optical fiber preform softened by heating, includes cooling the optical fiber at a cooling rate of not more than 4000° C. per second at a temperature of 1200 to 1400° C. of the optical fiber; and cooling the optical fiber at a cooling rate of not more than 8000° C. per second at a temperature of 850 to 1200° C. of the optical fiber. A drawing rate of the optical fiber is not less than 1000 meters per minute.

2 Claims, 6 Drawing Sheets

METHOD FOR MANUFACTURING OPTICAL FIBER AND THE COOLING OF THE OPTICAL FIBER

CROSS REFERENCE TO RELATED APPLICATION

This application is a continuation-in-part of application Ser. No. 11/084,144, filed Mar. 21, 2005, the entire contents of which are incorporated herein by reference.

BACKGROUND OF THE INVENTION

1. Field of the Invention

The present invention relates to an optical fiber which has a low transmission loss in a wavelength rang from 1300 to 1600 nanometers, an apparatus and a method for manufacturing the optical fiber.

2. Description of the Related Art

Reducing the transmission loss of optical fiber is enabled by a conventional technology in which, for example, a heating furnace which cools the optical fiber slowly is provided right under a drawing furnace, and the heating furnace cools the optical fiber at 500 to 1500° C. slowly to reduce the transmission loss of optical fiber (see Japanese patent Laid-open publication H04-59631). However, the transmission loss of optical fiber is not sometimes reduced even with the conventional technology. In this case, the transmission loss of optical fiber can be reduced by adjusting the viscosity of the core and the cladding (Japanese patent Laid-open publication 2002-148466).

However, it is not easy to control the species and the amount of dopant (Fluorine, Chlorine, and the like) for the core and the cladding and thereby to manage the viscosity or the refractive index of the core and the cladding. Accordingly, there are problems that a specific apparatus is required, thereby making the manufacturing apparatus for optical fiber complicated and larger, as well as increasing manufacturing steps and manufacturing time.

SUMMARY OF THE INVENTION

To solve the above problems, an object of the present invention is to provide an optical fiber which has a low transmission loss even though the fiber has a core doped with germanium and a cladding substantially made of $SiO_2$, and to provide an apparatus and a method for manufacturing the optical fiber.

A method for manufacturing optical fiber by drawing an optical fiber preform softened by heating according to one aspect of the present invention includes cooling the optical fiber at a cooling rate of not more than 4000° C. per second at a temperature of 1200 to 1400° C. of the optical fiber; and cooling the optical fiber at a cooling rate of not more than 8000° C. per second at a temperature of 850 to 1200° C. of the optical fiber.

An apparatus for manufacturing an optical fiber by drawing an optical fiber preform softened by heating according to another aspect of the present invention, includes a first slow-cooling unit that cools the optical fiber drawn from the optical fiber preform at a cooling rate of not more than 4000° C. per second at a temperature of the optical fiber of a not less than 1200 to 1400° C.; and a second slow-cooling unit that cools the optical fiber at a cooling rate of not more than 8000° C. per second at a temperature of 850 to 1200° C. of the optical fiber.

An optical fiber according to another aspect of the present invention, includes a core that is doped at least with germanium; and a cladding that is substantially made of SiO2. The optical fiber also has a relative refractive index difference of 0.3 to 0.5 percent of the core with the cladding; a mode field diameter of not less than 8 micrometers at a wavelength of 1310 nanometers; a cable cut-off wavelength $\lambda_{cc}$ of not more than 1270 nanometers by 22-meters method; and a transmission loss of not more than 0.35 dB/km at a wavelength of 1383 nanometers. Here, $\alpha = A/\lambda^4 + B$ is satisfied where $\alpha$ is the transmission loss, A is not more than 0.905, B is not more than 0.015, and $\lambda$ is a wavelength.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Preferred embodiments of an optical fiber, an apparatus and a method for manufacturing the optical fiber will be explained below.

Figure 1:
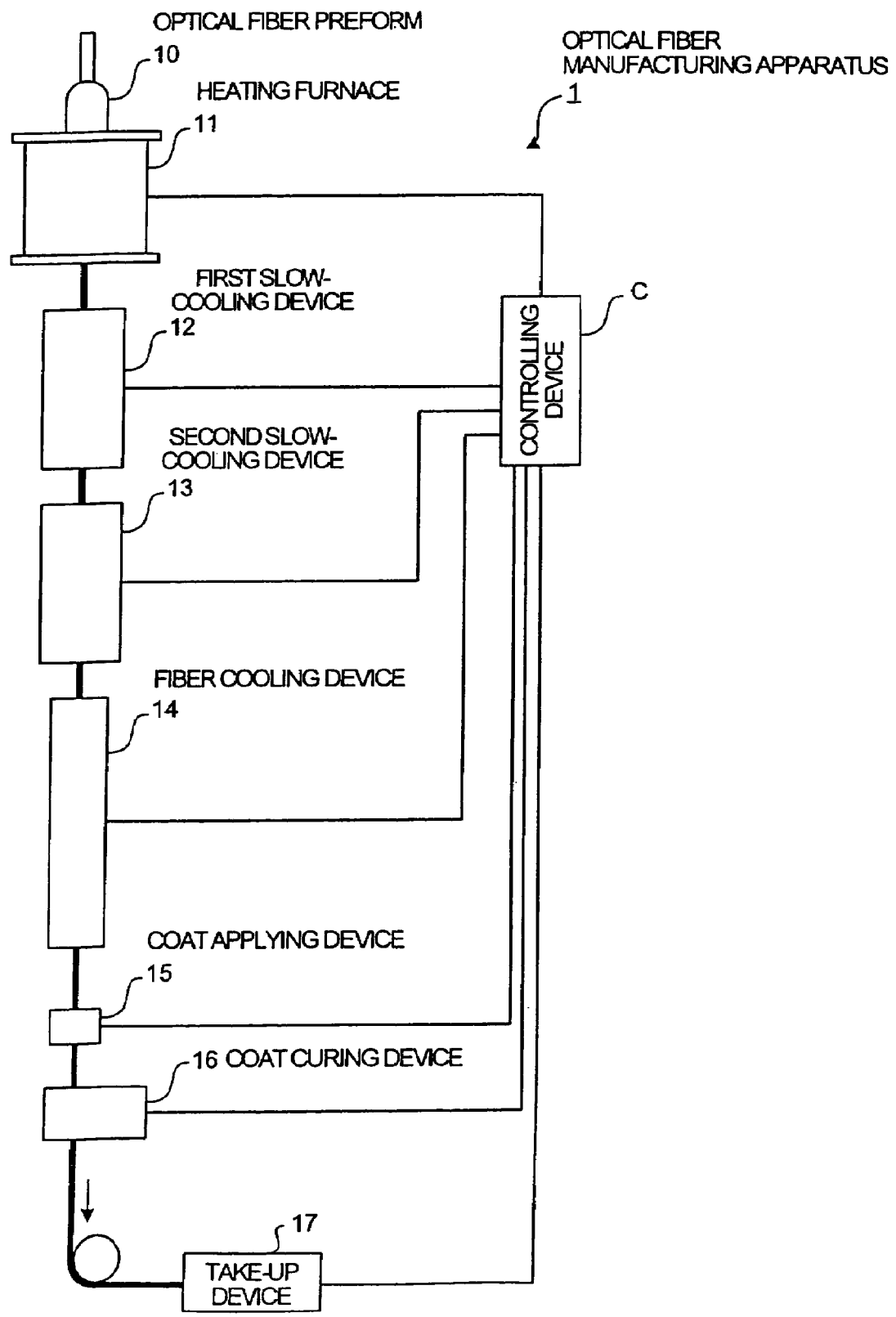
FIG. 1 is a schematic diagram of the configuration of an optical fiber manufacturing apparatus according to an embodiment of the present invention.

FIG. 1 is a schematic diagram of the configuration of an optical fiber manufacturing apparatus according to an embodiment of the present invention. The optical fiber manufacturing apparatus 1 manufactures an optical fiber which has a low transmission loss in a wavelength rang from 1300 to 1600 nanometers, by drawing. An optical fiber preform 10, which is a preform of the optical fiber, is heated at 2000° C. or higher by a heating furnace 11. A first slow-cooling device 12, a second slow-cooling device 13, a fiber cooling device 14, a coating device 15, a coat curing device 16, and a take-up device 17 are installed in series along the direction of drawing the optical fiber. The desired optical fiber is manufactured through the devices. A controlling device C controls each of the devices.

The first slow-cooling device 12 is a heating furnace which includes a heater, such as a nichrome wire, carbon heater, or kanthal heater, and a heat insulator and a shell which surround the heater. The first slow-cooling device 12 has a structure that a muffle tube made of quartz grass is provided in the center of the first slow-cooling device 12, and is installed along the direction of drawing the optical fiber. This first slow-cooling device 12 has a length of approximately 1.5 meters. The sort of gas introduced into a muffle tube is not limited, but air, nitrogen, argon gas, or the like is preferably used since the gas with high thermal conductivity, such as helium, consumes the heat energy. The optical fiber drawn from the heating furnace 11 is heated while traveling through the heating furnace of the first slow-cooling device 12. The optical fiber is cooled slower than that traveled through the air at room temperature. The effect of slow-cooling is small if the temperature of the heating furnace is approximately 700° C. or lower and consequently, as explained later, the manufacture of the optical fiber which has a low transmission loss cannot be expected. Setting the temperature of the heating furnace to approximately 1100° C. or higher allows the cooling rate of optical fiber to be further reduced and thus the effect of the low transmission loss of optical fiber may be expected. However, since a sufficient effect of slow-cooling is obtained at an approximately 1000° C. of the heating furnace, heating at high temperature results in a high cost of the heating furnace and attendant equipments, and the height of the optical fiber manufacturing apparatus 1 is limited and the fiber must have been sufficiently cooled down at the time of coating the optical fiber, it is not preferred to set the temperature of the first slow-cooling device 12 to an excessive temperature. Here, the temperature of the heating furnace indicates the set temperature of the furnace heater.

The temperature of the optical fiber being passing through the first slow-cooling device 12 is set from 1000 to 1500° C. Even though a temperature range higher than this range is included in a first slow-cooling range and the fiber is slowly cooled, the effect of the reduced transmission loss cannot be expected. Even though the optical fiber is cooled at the cooling rate faster than a cooling rate of 4000° C. per second or slower, e.g. 8000° C. per second, a sufficient effect of the reduced transmission loss can be achieved at 1000° C. or lower of the optical fiber.

The second slow-cooling device 13 has a length of approximately 1.5 meters, which is equal to the length of the first slow-cooling device 12, and controls the temperature by using the muffle tube in the same manner as the first slow-cooling device 12. Since the second slow cooling device 13 further cools the optical fiber cooled by the first slow-cooling device 12, the temperature of the optical fiber to be put into the second slow-cooling device 13 is lower than that of the optical fiber to be put into the first slow-cooling device 12. The second slow-cooling device 13 can realize such cooling by decreasing the set temperature of the muffle tube but does not have to include a heater as the first slow-cooling device 12 does. The temperature of optical fiber becomes 500 to 1100° C. by passing through the second slow-cooling device 13. That is, the temperature range of the optical fiber passing through the second slow-cooling device 13 is lower in temperature than that of the optical fiber passing through the first slow-cooling device 12. As explained later, due to the wide allowed range of cooling rate necessary for the practice of reducing the transmission loss, the heating furnace which has a heater is not used to avoid the high cost and the large scale of equipments.

For example, the cooling rate required in the second slow-cooling device 13 is not much different from the cooling rate of fiber in air (approximately 5000° C. per second) at 1000° C. of the optical fiber to be put into the second slow-cooling device 13.

Specifically, the second slow-cooling device 13 is a tube-like object in the direction of drawing optical fiber, e.g. a quartz glass tube and warm water controlled to be about room temperature is circulated around the tube-like object and the air, nitrogen, or argon gas is introduced. The use of helium gas having a large thermal conductivity as an ambient gas makes a condition for rapid cooling. In this case, a heater must be provided whose temperature is set to a temperature, for example 500° C., close to the temperature of the optical fiber being passing through the second slow-cooling device 13. Even though in this case, due to the temperature lower than that required in the first slow-cooling device 12, the same heater and control as those of the first slow-cooling device 12 are not necessary, and another heater, e.g. whose source of heat is vapor from a boiler, is to be used.

The temperature of the second slow-cooling device 13 is preferably low in the aspect of equipment, more preferably 500° C. or lower. The temperature of the second slow-cooling device 13 may be close to a room temperature (25° C.). For example, the second slow-cooling device 13 may be exposed to the air if the temperature is controllable.

The fiber cooling device 14 cools the optical fiber after passing the second slow-cooling device 13 to a room temperature. The coating device 15 applies resin as being a coating to the optical fiber which has been cooled to the room temperature by the fiber cooling device 14, and then the coat curing device 16 cures the resin applied. For example, if the applied resin is ultra violet curing resin, the coat curing device 16 is an ultraviolet curing device, then cures the resin by ultraviolet rays. The take-up device 17 pulls up the optical fiber which has come out of the coat curing device 16, and winds the fiber on a spool not shown in the figure. The drawing rate is determined by the rotation rate of winding, and is 1000 meters per minute or faster.

Figure 2:
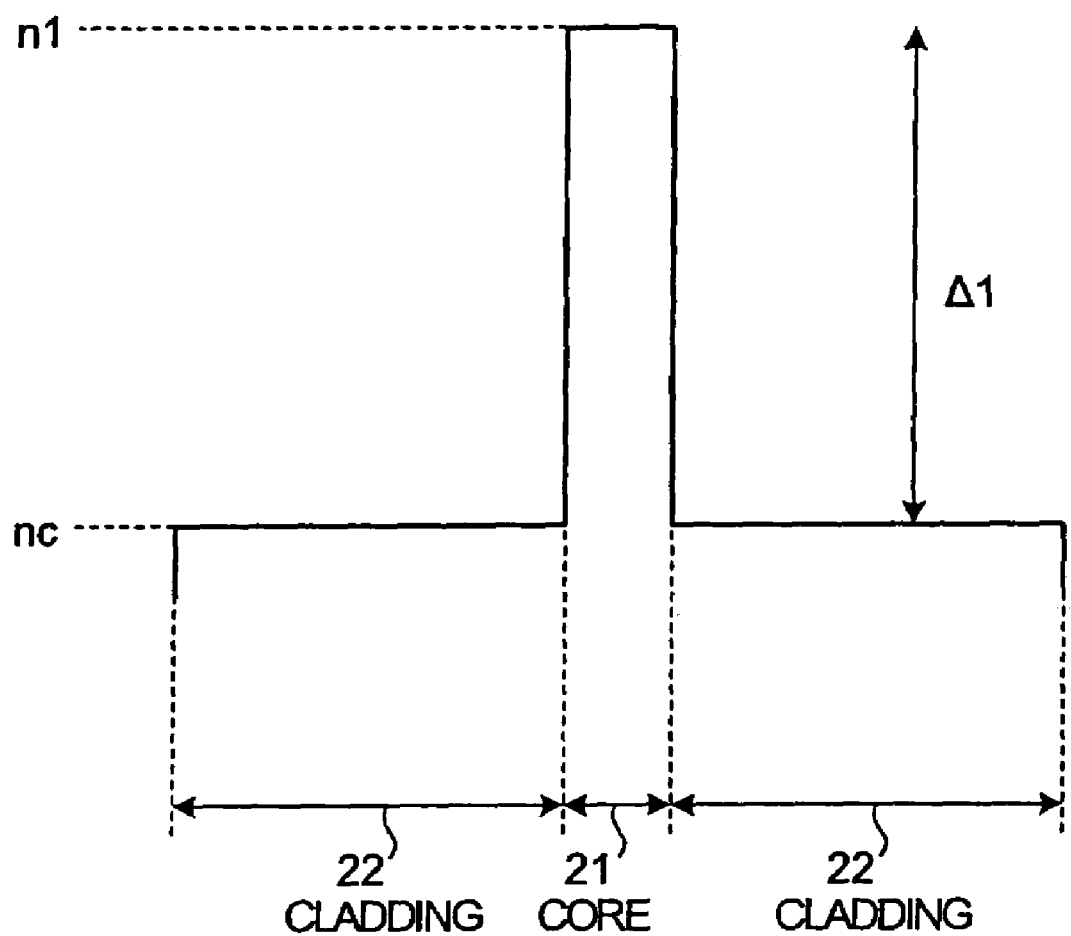
FIG. 2 shows a refractive index profile of an optical fiber preform.

The optical fiber manufactured by this optical fiber manufacturing machine is obtained by drawing the optical fiber preform 10 which has the refractive index profile shown in FIG. 2, and therefore the optical fiber obtained as a final product has the same refractive index profile. This optical fiber is a simple fiber having a core 21 and a cladding 22. At least germanium is doped into the core 21. The cladding 22 is substantially made of $SiO_2$. The expression, "the cladding 22 is substantially made of SiO", indicates that, for example, dopants used to adjust the refractive index, such as fluorine and the like, are not doped. The relative refractive index difference of the core 21 with cladding 22 is 0.3 to 0.5 percent. This is because the difference lower than 0.3 percent causes an increase in bending loss, and the difference more than 0.5 percent causes an increase in transmission loss in shorter wavelength caused by an increase in Rayleigh scattering loss.

There may be a low refractive index part which has a little lower refractive index than the cladding 22 between the core 21 and the cladding 22. The low refractive index part can be formed by e.g. doping fluorine with $SiO_2$, and it has effect improving a dispersion.

The mode field diameter (MFD) of the manufactured optical fiber at a wavelength of 1310 nanometers is set to 8 micrometers and more. This is because the mode field diameter smaller than 8 micrometers makes the splicing loss due to offset large. The cable cut-off wavelength $\lambda_{cc}$ of this optical fiber is 1270 nanometers and shorter. This cable cut-off wavelength $\lambda_{cc}$ determines the cut-off wavelength of a cable in use under 22-m method. Consequently, this optical fiber can be used as a single mode fiber in the wavelengths longer than 1270 nanometers. The optical fiber has a transmission loss of 0.35 dB/km or lower at a wavelength of 1383 nanometers. If the transmission loss is larger than that value, the loss becomes larger than the transmission loss at 1300 nanometers and affects the use in a wide range of wavelengths from 1300 to 1600 nanometers. The transmission loss a of optical fiber is expressed by $\alpha = A/\lambda^4 + B$. The first term $A/\lambda^4$ indicates Rayleigh scattering loss, and is caused by a glass composition and a density fluctuation in optical fiber. The first term includes $1/\lambda^4$, and thus it can be seen that the term affects the transmission loss of mainly shorter wavelength. The second term B is called as loss due to waveguide imperfection, and affects the transmission loss in the all wavelength range. Value A and value B are normally calculated from the wavelength-loss value by the cut-back method. The wavelength range to be used in this calculation is preferably the range which is not affected by the absorption loss at the wavelength 1.38 micrometers and the range which does not have any peak by a cut-off wavelength. In a case of an optical fiber whose cable cut-off wavelength is 1270 nanometers or shorter and has a enough length including a bended turn of 60ϕ as a mode filter, the peak of cut-off appears in the range of 1200 nanometers or shorter. The above point is concerned, as a example of calculating value A and value B, the wavelength-loss value of the wavelengths ranging from 1230 to 1320 nanometers is approximated by the method of least squares, then value A and value B are calculated from a slope and intercepts. The optical fiber manufactured by the manufacturing apparatus 1 has a value A of 0.905 and less and a value B of 0.015 and less. This is equivalent to a loss value of 0.321 dB/km at a wavelength of 1310 nanometers commonly used. The loss is lower than that of a conventional optical fiber which has a germanium doped core and a $SiO_2$ cladding.

The conditions of the first slow-cooling device 12 and the second slow-cooling device 13 for the practice of reducing the transmission loss of optical fiber will be described below. As described above, the longitudinal length of the second slow-cooling device 13 is set to the same value, approximately 1.5 meters, as the value of the longitudinal length of the first slow-cooling device 12. A kanthal heater is used as the heater of first slow-cooling device 12, and the temperature of the heater is set from 400 to 1200° C. Warm water of 25° C. is circulated as a temperature-keeper of the second slow-cooling device 13. Each of the first slow-cooling device 12 and the second slow-cooling device 13 has a quartz glass muffle tube and supplies argon gas at 35 litters per minute. The drawing rate is 1200 meters per minute.

Figure 3:
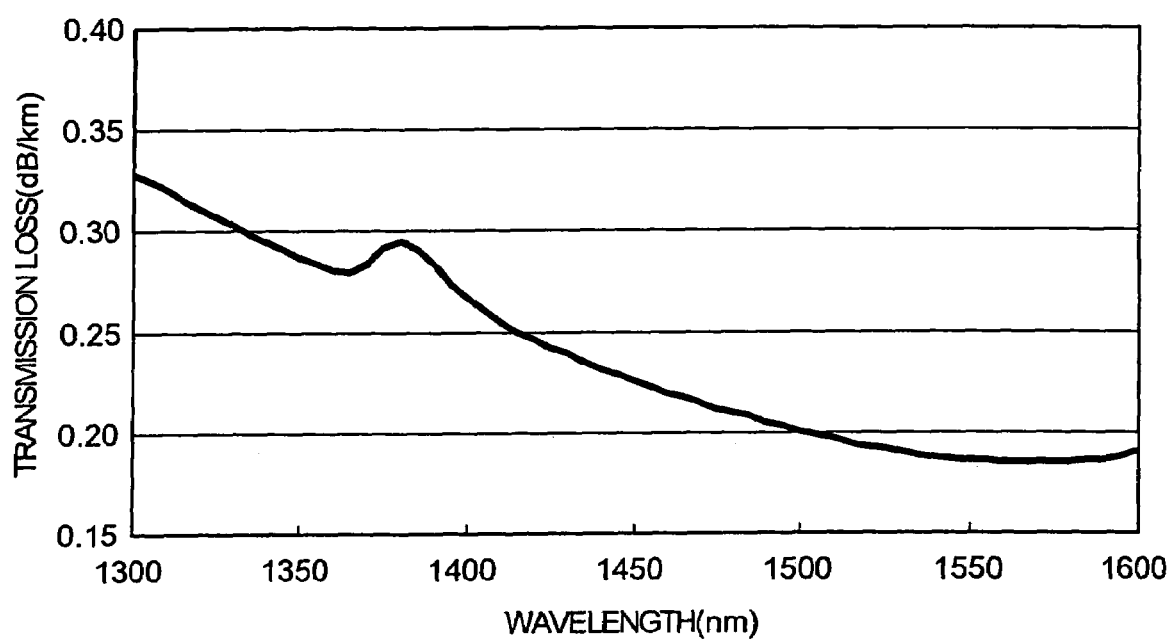
FIG. 3 shows a transmission loss in a wavelength rang from 1300 to 1600 nanometers of the optical fiber manufactured by the optical fiber manufacturing apparatus shown in FIG. 1.
Figure 4:
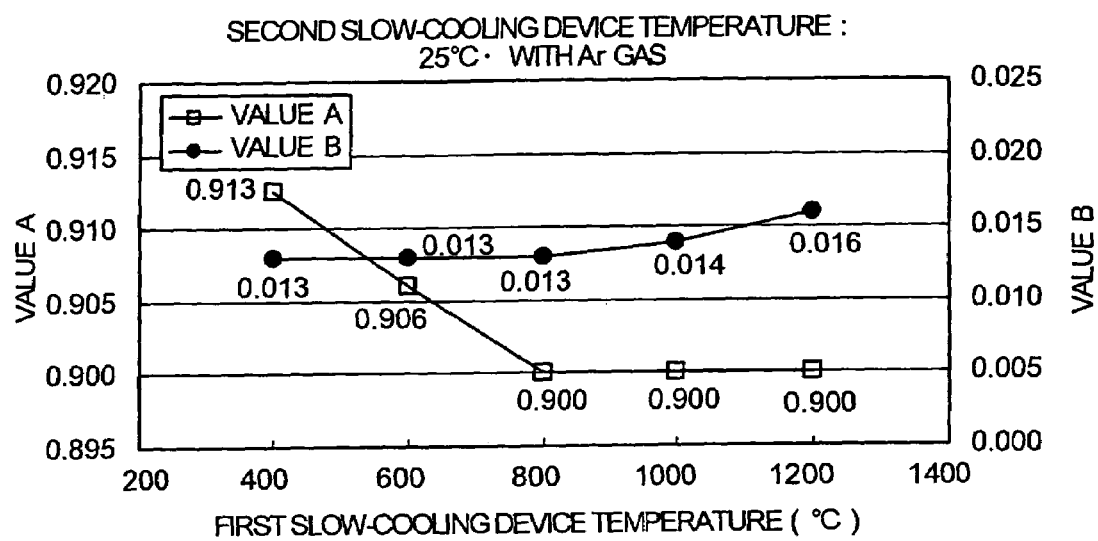
FIG. 4 shows a temperature dependence of a first slow cooling device in value A and value B at 25° C. of a second slow-cooling device with argon gas.

FIG. 3 shows the transmission loss in the wavelength ranging from 1300 to 1600 nanometers when the temperature of the first slow-cooling device 12 (the first slow-cooling device temperature) is set to 800° C. FIG. 4 shows the temperature dependence of the first slow-cooling device in value A and value B of the transmission loss α when the temperature of the second slow-cooling device 13 (the second slow-cooling device temperature) is set to 25° C.

As shown in FIG. 3, the transmission loss of the optical fiber obtained is 0.283 dB/km at a wavelength of 1383 nanometers. The relative refractive index difference Δ1 of the core 21 with the cladding 21 is 0.35 percent, MFD is 9.3 micrometers at 1310 nanometers, the cable cut-off wavelength $\lambda_{cc}$ is 1180 nanometers, and these values are hardly changed although the first slow-cooling device temperature is changed. The relative refractive index difference Δ1 is given as $$\Delta 1 = \{(n1^2 - nc^2)/2n1^2\} \times 100,$$

where n1 is the refractive index of the core 21 and nc is the refractive index of the cladding 22. The cable cut-off wavelength $\lambda_{cc}$ is the cable cut-off wavelength defined in ITU-T (International Telecommunication Union, Telecommunication Standardization Sector) G.650. The other terms not defined in this specification are in accordance with the definitions and measuring methods in ITU-T G.650.

As shown in FIG. 4, value A of the transmission loss is 0.905 and less, and the value B of the transmission loss is 0.015 and less at 800 and 1000° C. of the first slow-cooling device temperature. The transmission loss can be lowered by setting the first slow-cooling device temperature for approximately 700 to 1100° C. The conditions are that the temperature of optical fiber is 1450° C. at the inlet of first slow-cooling device 12 and 1050 to 1120° C. at the outlet. The temperature of the optical fiber is 980 to 1080° C. at the inlet of the second slow-cooling device 13, and 540 to 620° C. at the outlet of the second slow-cooling device 13. Consequently, the first slow-cooling device temperature is preferably set from 700 to 1100° C., and a forced cooling by setting the temperature lower than 700° C. is not preferred for reducing the transmission loss.

Figure 5:
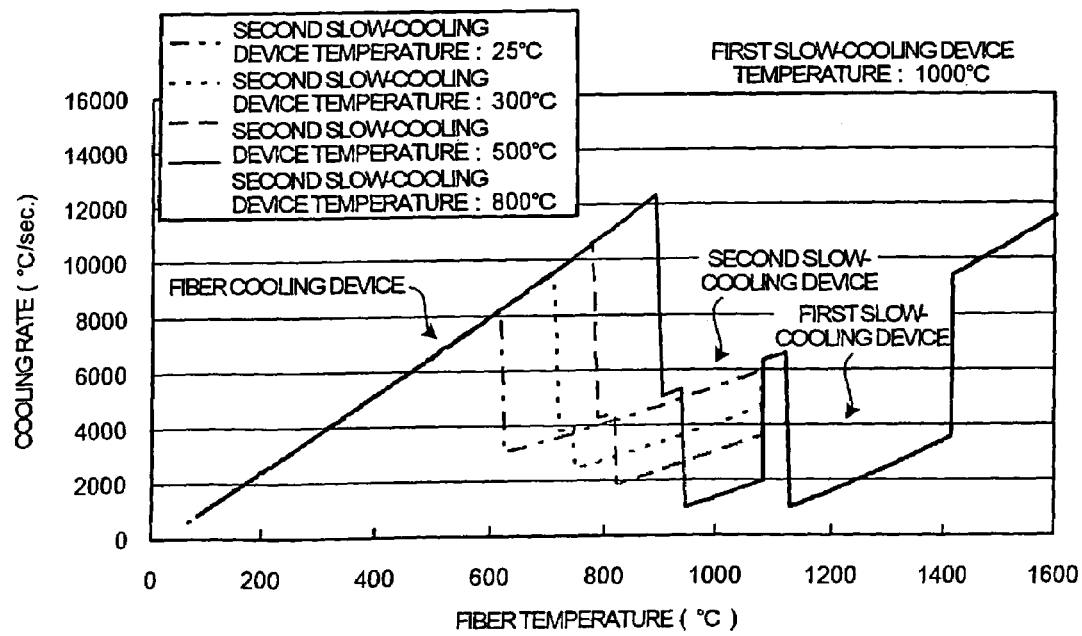
FIG. 5 shows a temperature dependence of the cooling rate of an optical fiber at 1000° C. of the first slow-cooling device and at various temperatures of the second slow-cooling device.

FIG. 5 shows the relationship of the fiber cooling rate and the fiber temperature at 1000° C. of the first slow-cooling temperature and at 25, 300, 500, and 800° C. of the second slow-cooling temperature. In FIG. 5, from the higher fiber temperature side, the first "convex downward" shape appears during the period of cooling by the first slow-cooling device 12. Furthermore, the next "convex downward" shape after the fiber temperature is lowered appears during the period of cooling by the second slow-cooling device 13. The "convex upward" shape between those indicates that the fiber is rapidly cooled by the contact with the air when entering the second slow-cooling device 13 from the first slow-cooling device 12. That means the first slow-cooling device 12 and the second slow-cooling device 13 are provided physically apart. As shown in FIG. 5, as the second slow-cooling device temperature is lowered, the cooling rate becomes faster, and the temperature of the fiber after passing through the second slow-cooling device 13 is high. When the second slow-cooling device temperature is 500° C. or lower, the cooling rate is 8000° C. per second or slower at 850 to 1200° C. of the optical fiber temperature, and the cooling rate is 4000° C. per second or slower at 1200 to 1400° C. of the optical fiber temperature.

Figure 6:
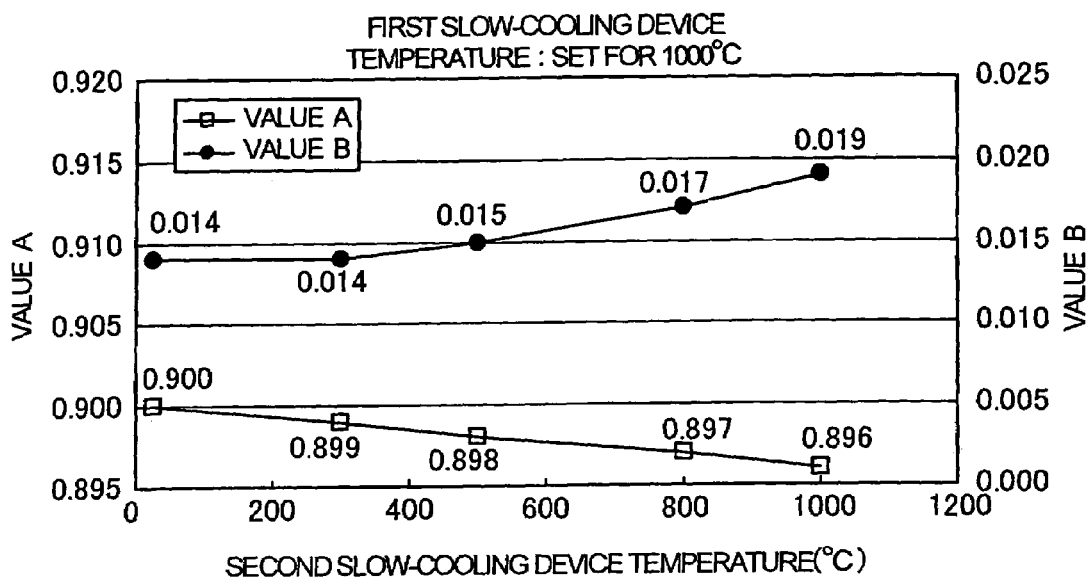
FIG. 6 shows a temperature dependence of the second slow-cooling device in value A and value B at 1000° C. of the first slow-cooling device.
Figure 7:
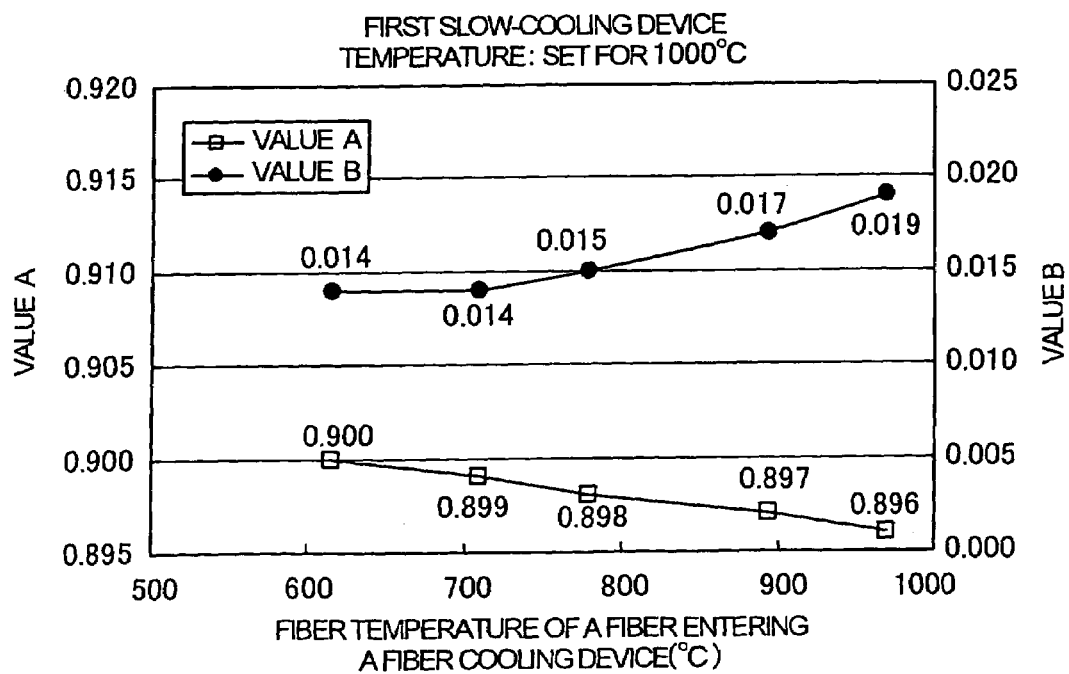
FIG. 7 shows a fiber temperature dependence of the inlet of a fiber cooling device in value A and value B at 1000° C. of the first slow-cooling device.

FIG. 6 shows the second slow-cooling temperature dependence of value A and value B at the set temperature of 1000° C. of the first slow-cooling temperature, and FIG. 7 shows the fiber temperature dependence of FIG. 6 when the fiber enters the fiber cooling apparatus 14. In FIG. 6 and FIG. 7, value B becomes large at 800 and 1000° C. of the second slow-cooling device temperature. The temperatures of the fiber entering the fiber cooling device 14 are approximately 900 and 970° C. Consequently, to achieve the effect of improving value B, the second slow-cooling device temperature is preferably set to approximately 700° C. or lower, in other words, the temperature of the fiber entering the fiber cooling device 14 is preferably set to approximately 850° C. or lower.

When the second slow-cooling device temperature exceeds 700° C., as shown in FIG. 5, although the fiber is slowly cooled at the suppressed cooling rate of 4000° C. per second or slower of the second slow-cooling device 13, the temperature of the fiber entering the fiber cooling device 14 exceeds 850° C., and the cooling rate is 12000° C. per second. It is supposed that this causes the deterioration of value B. To lower the temperature of the fiber entering the fiber cooling device 14, the second slow-cooling device temperature must be set to 700° C. or lower. This demand includes suppressing the cooling rate to approximately 8000° C. or slower at the fiber cooling device 14.

As shown in FIG. 5, when the second slow-cooling device temperature is 800° C., the temperature of the fiber entering the first slow-cooling device exceeds 850° C., and the cooling rate becomes 12000° C. per second. This causes an increase in value B. However, if it is possible to increase the longitudinal length of the second slow-cooling device 13, the fiber temperature decreases, the temperature of the fiber entering the fiber cooling device 14 decreases, and the cooling rate of 8000° C. or slower can be satisfied. As described above, FIG. 5 is based on the assumption that the second slow-cooling device 13 has the same longitudinal length when the longitudinal length is 1.5 meters and the drawing rate is 1200 meters per minute.

The conventional drawing method is an extension of a slow-cooling technology in a glass manufacturing, and includes essentially slow-cooling in temperature range of the glass transition point or above to reduce the density fluctuation of glass and thus to reduce the fictive temperature (the temperature in which the atomic structure of glass is settled). Value A is known to be proportional to the ideal temperature. In general, the glass transition point is known to be nearly 1200° C. By slow-cooling of the high temperature optical fiber down to this temperature, in other words, by setting the cooling rate for 4000° C. per second or slower at 1200 to 1400° C. of the optical fiber, value A can be improved. In this embodiment, it is found that a temperature range below this temperature range is effective for improving value B. Information about cooling rate in the temperature range is also obtained. It is found that the cooling rate should be set to 4000° C. per second or slower at 1200 to 1400° C. of the optical fiber, and moreover the cooling rate should be set to 8000° C. per second or slower at 850 to 1200° C. of the optical fiber. This means that a cooling rate of 8000° C. per second or slower at 850 to 1400° C. of the optical fiber can reduce the residual stress of the core/cladding interface and improve value B. Since the fiber temperature has been decreased, a lower cooling rate of the optical fiber at 850 to 1200° C. of the optical fiber (e.g. 4000° C. per second or slower) does not make a significant contribution to the improvement of value A. Rather, due to equipment constraints, a too much low cooling rate makes it difficult to sufficiently cool the optical fiber (e.g. down to 850° C. or lower) before the optical fiber is put into the fiber cooling device 14.

In this embodiment, when the drawing rate is set to 1000 meters per minute or faster and each of the first slow-cooling device 12 and the second slow-cooling device 13 has a length of approximately 1.5 meters, the optical fiber having the low transmission loss can be obtained by setting the first slow-cooling device temperature to 700 to 1100° C. and by setting the second slow-cooling device temperature to 700° C. or lower.

Figure 8:
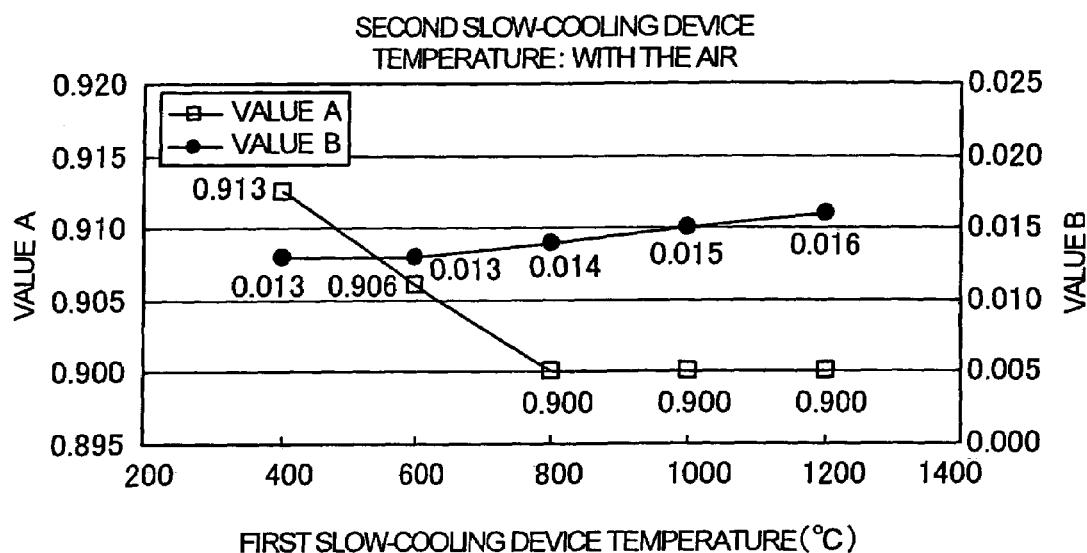
FIG. 8 shows a temperature dependence of the first slow-cooling device in value A and value B when the second slow-cooling device is exposed to the air.

The second slow-cooling device 13 is not limited to circulate warm water as described in the above embodiments, and may be exposed to the air to be kept at a room temperature (25° C.) FIG. 8 shows a first slow-cooling device temperature dependency of value A and value B when the second slow-cooling device 13 is exposed to the air. Although value B is increased by 0.001 at 1000° C. of the first slow-cooling device temperature, the same result as the result shown in FIG. 4 can be obtained.

The obtained temperature of the outlet of the first slow-cooling device 12 was 1080 to 1150° C., and the obtained temperature of the inlet of the fiber cooling device 14 was 520 to 600° C. In the obtained optical fiber, the relative refractive index difference Δ1 of the core with the cladding was 0.35 percent, the MFD at 1310 nanometers was 9.3 micrometers, the cable cut-off wavelength $\lambda_{cc}$ was 1170 nanometers, the transmission loss at 1383 nanometers was 0.283 dB/km. These values were hardly changed although the first slow-cooling device temperature was varied in the range from 400 to 1200° C.

Figure 9:
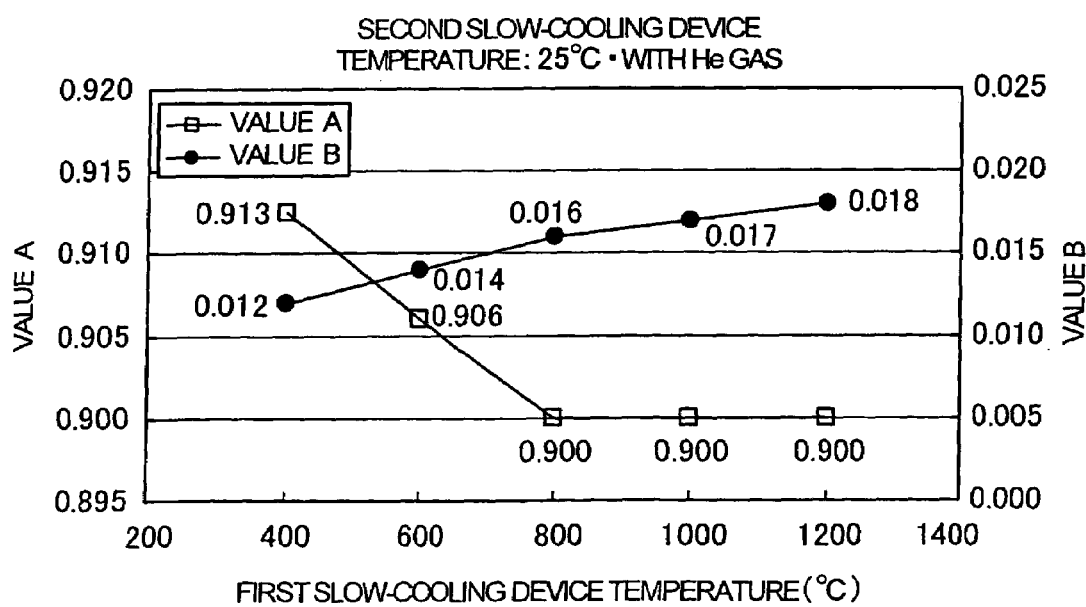
FIG. 9 shows a temperature dependence of the first slow-cooling device in value A and value B at 25° C. of the second slow-cooling device with helium gas.

FIG. 9 shows, as a comparative example, the result of a first slow-cooling device temperature dependency of value A and value B when helium gas is supplied in the muffle tube, and the other conditions are identical to those of the embodiment. Value A is improved, but the effect of improvement of value B is small. At this point, the obtained cooling rate of the optical fiber was 14000° C. per second at 1000° C. of the optical fiber temperature. In the obtained optical fiber, the relative refractive index difference Δ1 of the core with the cladding was 0.36 percent, the MFD at 1310 nanometers was 9.2 micrometers, the cable cut-off wavelength $\lambda_{cc}$ was 1160 nanometers, the transmission loss at 1383 nanometers was 0.283 dB/km. These values were hardly changed although the first slow-cooling device temperature was varied in the range from 400 to 1200° C.

The first slow-cooling device 12 and the second slow-cooling device 13 are not limited to be placed physically apart from each other, may be configured to be a continuous device. Also in this case, the cooling rate of the optical fiber is 8000° C. per second or slower at 850 to 1200° C. of the optical fiber temperature and moreover, the cooling rate is 4000° C. per second or slower at 1200 to 1400° C.

Since the temperature of the optical fiber itself is decreased when compared with that of the first slow-cooling device 12, a low cooling rate of the optical fiber due to an increase in the temperature of the second slow-cooling device 13 does not make a significant contribution to the improvement of value A. Rather, a too much high temperature of the second slow-cooling device 13 makes high the temperature of the optical fiber after passing through the second slow-cooling device 13, and thus the temperature range which affects the improvement of value B is included in the fiber cooling device 14. Accordingly, value B deteriorates.

As described above, the optical fiber which has a low transmission loss can be obtained by only heat control that the optical fiber is cooled at the cooling rate of 4000° C. per second or slower at 1200 to 1400° C. of the optical fiber temperature and the optical fiber is cooled at the cooling rate of 8000° C. per second or slower at 850 to 1200° C. of the optical fiber temperature.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for manufacturing optical fiber by drawing an optical fiber preform softened by heating, the optical fiber comprising a core into which at least germanium is doped; a cladding that is substantially made of $SiO_2$, a relative refractive index difference of 0.3 to 0.5 percent of the core with the cladding; a mode field diameter of not less than 8 micrometers at a wavelength of 1310 nanometers; and a cable cut-off wavelength $\lambda_{cc}$ of not more than 1270 nanometers by 22-meters method, the method comprising:

cooling the optical fiber at a cooling rate of not more than 4000° C. per second at 1200 to 1400° C. of the temperature of the optical fiber with a first slow cooling unit at 800 to 1000° C.; and cooling the optical fiber at a cooling rate of not more than 8000° C. per second at a temperature of 850 to 1200° C. of the optical fiber with a second slow cooling unit at not less than 300° C. and not more than 700° C., wherein a drawing rate of the optical fiber is not less than 1000 meters per minute.

2. The method according to claim 1, wherein cooling of the optical fiber at a cooling rate of not more than 8000° C. per second includes cooling the optical fiber in argon gas.

* * * * *